US006085333A

United States Patent [19]
DeKoning et al.

[11] Patent Number: 6,085,333
[45] Date of Patent: Jul. 4, 2000

[54] METHOD AND APPARATUS FOR SYNCHRONIZATION OF CODE IN REDUNDANT CONTROLLERS IN A SWAPPABLE ENVIRONMENT

[75] Inventors: Rodney A. DeKoning; Dale L. Harris; Donald R. Humlicek, all of Wichita; John V. Sherman; Timothy R. Snider, both of Derby, all of Kans.

[73] Assignee: LSI Logic Corporation, Milpitas, Calif.

[21] Appl. No.: 08/994,634

[22] Filed: Dec. 19, 1997

[51] Int. Cl.[7] ........................................... G06F 11/00
[52] U.S. Cl. ........................ 714/7; 714/11; 714/12; 714/13; 714/820; 714/819; 707/202; 707/203
[58] Field of Search .................... 714/11, 12, 13, 714/820, 819, 811, 798, 21, 7, 6; 707/202, 203

[56] References Cited

U.S. PATENT DOCUMENTS

| | | | |
|---|---|---|---|
| 4,141,066 | 2/1979 | Keiles | 700/81 |
| 4,468,731 | 8/1984 | Johnson et al. | 364/200 |
| 4,875,159 | 10/1989 | Cary et al. | 707/203 |
| 4,914,576 | 4/1990 | Zelley et al. | 714/21 |
| 5,155,847 | 10/1992 | Korouac et al. . | |
| 5,274,645 | 12/1993 | Idleman et al. | 371/10.1 |
| 5,430,747 | 7/1995 | Jibbe et al. | 371/57.1 |
| 5,493,674 | 2/1996 | Mizutani et al. | 714/6 |
| 5,504,882 | 4/1996 | Chai et al. | 395/182.03 |
| 5,530,831 | 6/1996 | Akiyama et al. | 395/441 |
| 5,546,535 | 8/1996 | Stallmo et al. | 395/182.07 |
| 5,557,735 | 9/1996 | Pinkston, II et al. | 714/1 |
| 5,590,276 | 12/1996 | Andrews | 395/182.04 |
| 5,619,644 | 4/1997 | Crockett et al. | 395/183.21 |
| 5,682,518 | 10/1997 | Inoue | 711/162 |
| 5,684,702 | 11/1997 | Phillips et al. | 714/54 |
| 5,699,504 | 12/1997 | Mano . | |
| 5,699,510 | 12/1997 | Petersen et al. | 711/113 |
| 5,761,705 | 6/1998 | DeKoning et al. | 711/162 |
| 5,787,485 | 7/1998 | Fitzgerald, V et al. | 714/6 |
| 5,793,943 | 8/1998 | Noll | 707/204 |
| 5,835,913 | 11/1998 | Leavitt et al. | 701/76 |
| 5,867,714 | 2/1999 | Todd et al. | 395/712 |
| 5,915,080 | 6/1999 | Park | 714/6 |

OTHER PUBLICATIONS

SPI; Software patent Institute Database of Software Technologies Record Display; pp. 1–3; Feb. 1996; Raid Disk Arrays with Redundant Configuration Data.

*Primary Examiner*—Robert W. Beausoliel, Jr.
*Assistant Examiner*—Bryce P. Bonzo

[57] ABSTRACT

Methods and associated apparatus for automatically synchronizing the operating code between a plurality of controllers. In a first embodiment after the spare controller is swapped into the storage subsystem, if the native controller determines that the spare controller's operating code is incompatible with the native controller's operating code, then the native controller notifies the spare controller that synchronization is required between both controllers. The native controller creates an image of its operating code including configuration parameters, and copies this "synch info" into a reserved area of cache memory. The spare controller's main CPU utilizes mirroring routines to copy the operating code and configuration parameters into a reserved area of its cache memory. After the transfer is complete, the spare controller's main CPU loads the operating code and configuration parameters into its program memory and resets itself to operate with the modified program memory. In a second embodiment, a co-processor within the spare controller updates the spare controller's operating code by executing a script. The native controller builds the script that includes the operating code, configuration parameters, and instructions to retrieve the operating code and configuration parameters from the native controller's cache memory. The spare controller's co-processor transfers the script to a reserved area in the spare controller's cache memory. The native controller requests the spare controller's co-processor to execute the script which causes the co-processor to retrieve the operating code using mirroring techniques and load the spare controller's program memory with the operating code. The co-processor sends an interrupt to the spare controller's main processor to reset the spare controller.

17 Claims, 6 Drawing Sheets

| CONTROLLER A BEING SWAPPED IN | | CONTROLLER B IN SYSTEM | | | | RESULT |
|---|---|---|---|---|---|---|
| CONTROLLER TYPE | FIRMWARE REV. WRT B | CONTROLLER TYPE | FIRMWARE REV. WRT A | ACS ENABLED BIT | 0 - SYNC FOREIGN CONTROLLER ONLY 1 - 1 SYNC ANY CONTROLLER | |
| FOREIGN | OLDER | NATIVE | NEWER | 1 | X | CONTROLLER A IS SYNCHRONIZED WITH B |
| FOREIGN | OLDER | NATIVE | NEWER | 0 | X | CONTROLLER A IS NOT SYNCHRONIZED |
| FOREIGN | OLDER | FOREIGN | NEWER | X | X | CONTROLLER A IS SYNCHRONIZED WITH B |
| FOREIGN | NEWER | FOREIGN | OLDER | X | X | CONTROLLER A IS NOT SYNCHRONIZED[1] |
| NATIVE | OLDER | NATIVE | NEWER | 1 | 1 | CONTROLLER A IS SYNCHRONIZED WITH B |
| NATIVE | OLDER | NATIVE | NEWER | 1 | 0 | CONTROLLER A IS NOT SYNCHRONIZED |
| NATIVE | OLDER | NATIVE | NEWER | 0 | X | CONTROLLER A IS NOT SYNCHRONIZED |
| NATIVE | NEWER | NATIVE | OLDER | X | X | CONTROLLER A IS NOT SYNCHRONIZED[1] |

[1] ON NEXT POWER CYCLE THE ROLES OF CONTROLLER A AND B MAY CHANGE WHICH WOULD CAUSE CONTROLLER B TO BE SYNCHRONIZED

METHOD AND APPARATUS FOR SYNCHRONIZATION OF CODE IN REDUNDANT CONTROLLERS IN A SWAPPABLE ENVIRONMENT

BACKGROUND OF THE INVENTION

1. Field of the Invention

The present invention relates to the field of synchronizing operating code and in particular to methods and apparatus for synchronizing operating code in redundant disk storage subsystem controllers in a disk storage subsystem.

2. Discussion of Related Art

Typically, a computer stores data within devices such as hard disk drives, floppy drives, tape, compact disk, etc. These devices are otherwise known as storage devices. If a large amount of data requires storage, then a multiple of these devices are connected to the computer and utilized to store the data. A computer typically does not require knowledge of the number of storage devices that are being utilized to store the data because another device, the storage subsystem controller, is utilized to control the transfer of data to and from the computer to the storage devices. The storage subsystem controller and the storage devices are typically called a storage subsystem and the computer is usually called the host because the computer initiates the requests for data from the storage devices.

The operating code in a storage subsystem controller (hereinafter referred to as controller) executes software that manages the transfer of data to and from disk drives in a disk storage subsystem. A disk storage subsystem often has a redundant controller to increase reliability of the storage subsystem such that if the primary controller fails, the redundant controller manages the storage and transfer of data to and from the storage subsystem. The primary controller and redundant controller can operate in a dual controller configuration.

The dual controller configuration can be operating in active/passive mode, that is, both controllers are online but one controller functions as a primary controller to receive read and write requests from the host computer while the other controller functions as a redundant controller (e.g. hot spare). Alternatively, the dual controller configuration can be operating in active/active mode, that is, both controllers are online and both controllers function as a primary controller and a redundant controller. In active/passive mode or active/active mode when a primary or redundant controller fails, the new controller swapped into the dual controller configuration is known as the foreign controller, and the surviving controller is known as the native controller.

In a dual controller configuration, a difficulty arises when one controller fails. A possibility exists that the failed controller is removed and replaced with a foreign controller (e.g., spare controller) that contains an incompatible software revision and configuration parameters within firmware. The software revision and configuration parameters of the foreign (spare) controller may be older or newer than the native controller or the surviving controller currently operating in the dual controller configuration. Dual controllers (e.g., primary and redundant controllers) operating in a dual controller configuration require that both controllers are compatible to ensure that the foreign controller does not destroy subsystem configurations that are being used by the native controller. Incompatibility is a result of the foreign controller operating a version of software with configuration parameters not compatible to the version of the native controller because of software and configuration parameter updates.

Typically, it may not be possible to determine the software revision level within the controller firmware of the spare controller before placing the spare controller in the disk array storage subsystem. Furthermore, it may not be possible to download software code and configuration parameters to the spare controller firmware that is compatible with the native controller software revision before the spare controller is swapped into the disk array storage subsystem.

It is known in the art for a user to manually modify the spare controller's operating code after the controller has been initialized and brought online. If the spare controller is operating incompatible code, it is known for the user to take the controller offline and manually modify program memory with the operating software and configuration parameters compatible with the surviving controller. However, this interrupts host I/O requests because the spare controller is brought offline and host I/O requests may be lost if they are not rerouted though the redundant disk array configuration software.

The user utilizes application software that loads the operating code that matches that of the native controller into the program memory of the spare controller. Once the program memory modification is complete, but before the spare controller is online, a hardwired reset line between the dual controllers provides an interrupt signal to the spare controller. The spare controller then begins to execute the newly downloaded software. Thus, the reset signal provides a means to resynchronize the configuration information between the spare and surviving controllers. A problem arises with this solution because many newer controllers do not have the hardware to accept interrupts from the hardwired-reset line.

A need exists to automatically synchronize the code between a native and foreign controller when a spare controller is initially swapped into the dual controller configuration to eliminate the need for manually modifying the operating code. A need exists to reduce the interruption and loss of host I/O requests. Similarly, a need exists for eliminating the hardwired-reset line to force an interrupt on the spare controller's processor.

SUMMARY OF THE INVENTION

This present invention solves the above and other problems, thereby advancing the useful arts, by providing methods and apparatus for comparing the software code in a spare controller and native controller and modifying the spare controller's operating code using a copy of the native controller's operating code if the two revisions are not compatible. The present invention allows the modification of the spare controller's operating code without the intervention of the host or manual operator and without requiring any special hardware. In a first embodiment, the main CPU in the spare controller updates its code from a mirrored copy in its cache. In a second embodiment, a co-processor within the spare controller updates the main CPU's code within the spare controller by executing a script with the compatible operating code.

In the first embodiment, after the spare controller is swapped (e.g., hot, warm or cold) into the storage subsystem, the spare controller is initialized. As part of the initialization, the spare controller communicates with the native controller through the communication paths utilized for mirroring (e.g., redundancy control). The spare controller sends a message to the native controller requesting the native controller to verify that the spare controllers code is valid. The native controller compares the spare controller's code revision with its own and sends a response of 'code valid' or 'code invalid' to the spare. If the 'code invalid' response is sent, the spare controller allocates memory for the operating code image and sends the native controller a request to update the spare controller's code along with the memory address to store the code. Thus, the native controller determines if the code is compatible and if the code synchronization is needed.

Meanwhile during the start of initialization, the spare controller's processor downloads its operating code from program memory to cache memory. The processor begins to execute its operating code in cache. Although the spare controller's operating code is compatible enough to communicate with the native controller, the software revision and configuration parameters of the spare controller may be older or newer than the operating code within the native controller currently operating in the dual controller configuration. This incompatibility will destroy subsystem configurations that are being used by the native controller.

The native controller creates an image of its operating code including configuration parameters, and copies this "synch info" into a reserved area of its cache memory. An ordinary person skilled in the art will recognize it is equally feasible to store the copy of the native controller's software and configuration parameters in statically or dynamically allocated portion of a disk drive to pass this information between controllers. The native controller then utilizes mirroring routines to transfer the image to the spare controller. If the synch info is successfully transferred, the spare controller will begin to execute the mirrored operating code within its cache. The spare controller then processes the synch info to modify its operating code within program memory and resets itself to operate on the compatible operating code.

In a second embodiment, a co-processor within the spare controller is utilized to modify the spare controller's operating code by executing a script. The script includes the synch info and instructions, which the co-processor executes to modify operating code within the spare controller's program memory.

In this embodiment, the native controller compares its operating code to that of the spare controller and determines that the spare controller is not operating a compatible version of code. The native controller allocates an area of cache memory, creates an image of its operating code, and loads the image within an allocated area of cache memory. The native controller also builds the script and stores the script within the allocated area of cache memory. The script has instructions for the co-processor within the spare controller to retrieve the script and synch info from the native controller's cache memory, and transfer the script and synch info to a reserved area in the spare controller's cache memory.

The native controller requests the spare controller's co-processor to execute the script. The co-processor retrieves the operating code and configuration parameters using mirroring techniques. The co-processor executes the rest of the script by loading, that is, burning the spare controller's program memory with the operating code and interrupts the spare controller's main processor to reset the spare controller's main CPU.

The present invention allows the native controller to modify the spare controller's software and configuration parameters using logical processes and therefore does not depend upon any special hardware within the spare controller.

The spare controller has read only access to the system configuration information that is being used by the native controller and cannot modify any system configuration until code synchronization is complete. This prevents current configuration information from being overwritten by the spare controller during the initialization process.

The present invention does not require a determination of the software revision level, within the controller firmware, of the spare controller before placing the spare controller in the disk array storage subsystem. Thereby eliminating the need for special host intervention or manual operator intervention to synchronize redundant controllers.

An ordinary person skilled in the art will furthermore recognize that the present invention is applicable to other environments where multiple controllers need to have compatible code to operate, such as, controllers in robotic machinery.

It is therefore an object of the present invention to provide associated apparatus and associated methods for synchronizing the operating code of controller's within a dual controller configuration by comparing operating codes between a native and spare controller, and modifying the spare controller's operating code if it is incompatible with the native controller's operating code.

It is a further object of the present invention to provide associated apparatus and associated methods for automatically synchronizing software in a spare device by providing a parameter in the surviving controller that allows the option to automatically synchronize the software in the spare controller.

It is yet another object of the present invention to provide associated apparatus and associated methods for synchronizing the operating code of controller's within a dual controller configuration by allowing the automatic modification of operating code only for spare controllers.

It is still another object of the present invention to provide associated apparatus and associated methods for synchronizing the operating code of controllers within a dual controller configuration by allowing the automatic modification of operating code for any controller with an incompatible operating code.

It is therefore an object of the present invention to provide associated apparatus and associated methods for synchronizing software in a spare device by allowing the native controller to create an image of its operating code and instructing the spare controller to retrieve a copy of this image to burn within its program memory.

The above and other objects, aspects, features, and advantages of the present invention will become apparent from the following description and the attached drawings.

DETAILED DESCRIPTION

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

Figure 1A:
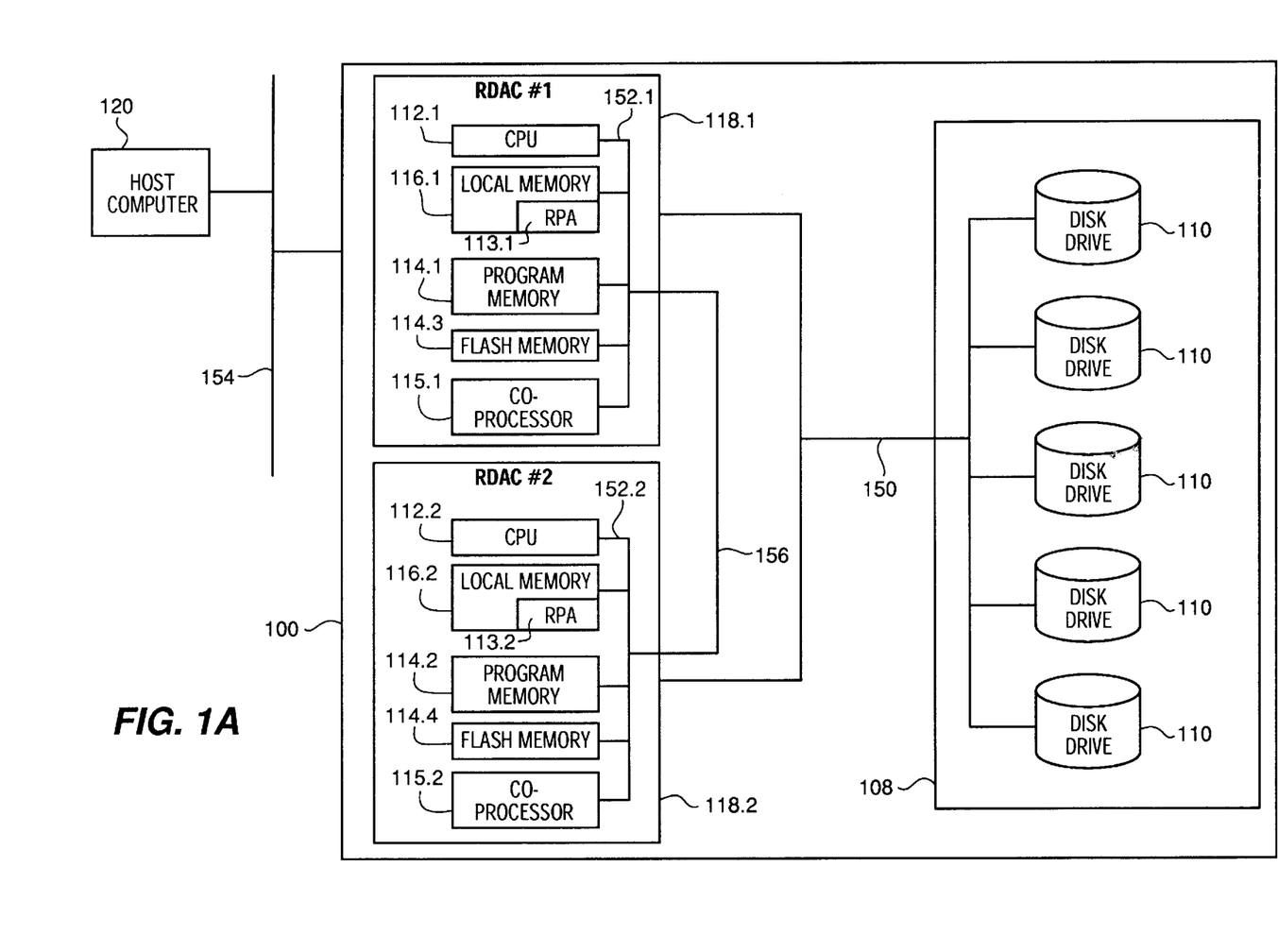
FIG. 1A is a block diagram of the present invention in which the methods of the present invention are advantageously applicable.

FIG. 1A is a block diagram of a typical RAID storage subsystem 100, having redundant disk array controllers 118.1 and 118.2 (hereinafter referred to as RDACs and as primary and redundant controllers), in which the methods and associated apparatus of the present invention may be applied. RAID storage subsystem 100 includes at least one pair of RDACs 118.1 and 118.2. Each RDAC 118.1 and 118.2 is in turn connected to disk array 108 via bus (or busses) 150 and to host computer 120 via bus 154. Disk array 108 is comprised of a plurality of disk drives 110. One of ordinary skill in the art will readily recognize that interface bus 150 between RDACs 118.1 and 118.2 and disk array 108 (including disk drives 110) may be any of several industry standard interface busses including SCSI, IDE, EIDE, IPI, Fiber Channel, SSA, PCI, etc. Circuits (not shown) within RDACs 118.1 and 118.2 appropriate to controlling bus 150 are well known to those of ordinary skill in the art.

Interface bus 154 between RDACs 118.1 and 118.2 and host computer 120 may be any of several standard industry interface busses including SCSI, Ethernet (LAN), Token Ring (LAN), etc. Circuits (not shown) within RDACs 118.1 and 118.2 appropriate to controlling bus 154 are well known to those of ordinary skill in the art.

As shown in FIG. 1A, RAID storage subsystem 100 may be utilized to implement any of the well known RAID levels (e.g. levels 0–5). The various RAID levels are distinguished by the manner in which the associated RAID controller logically subdivides or partitions the disk drives 110 in disk array 108. For example, when implementing RAID level 1 features, approximately half of the disk drives 110 of disk array 108 are used to store and retrieve data while the other half is operated by the RAID controller to mirror the data storage contents of the first half. Further, when implementing RAID level 4 features, the RAID controller utilizes a portion of the disk drives 110 in disk array 108 for the storage of data and the remaining disk drives 110 are utilized for the storage of error checking/correcting information (e.g. parity information). As discussed below, the methods and associated apparatus of the present invention may be applied to the RAID storage subsystem 100 in conjunction with any of the standard RAID levels.

RDAC 118.1 includes main CPU 112.1, flash memory 114.3 and program memory 114.1 for storing program instructions and variables for the operation of CPU 112.1, local memory 116.1 (also referred to as cache memory) for storing data and control information related to the data stored in disk array 108, RAID Parity Assist (RPA) 113.1 memory, and co-processor 115.1 for controlling the transfer of data to and from the disk drives 110.

Co-processor 115.1 is an inter-controller communication chip (ICON) application specific integrated circuit (ASIC) that provides communication and coordination for the transfer of data between the native controller's RPA memory 113.1 to the spare controller's RPA memory 113.2 without assistance of the CPU. In this case, the ICON ASIC executes application specific code which includes a set of address ranges to perform data transfers.

CPU 112.1, flash memory 114.4, program memory 114.1, cache memory 116.1, and co-processor 115.1 are connected via memory bus 152.1 to enable CPU 112.1 to store and retrieve information in the memory devices 116.1, 114.1.

RPA memory 113.1 stores data computed by the RAID Parity Assist (RPA) logic (not shown). RPA memory is part of the cache memory 116.1. The RAID Parity Assist logic provides parity computation assistance for the storage and retrieval of data in cache buffer 116.1. The present invention utilizes this area of cache memory 116.1 during the synchronization process to store an image of the controller's operating code and configuration parameters. An ordinary person skilled in the art will recognize that another area in cache memory 116.1 can similarly be used to store the image of the controller's operating code and configuration parameters.

An ordinary person skilled in the art will further recognize that if the hardware implementation is currently available in the controller, that it is equally feasible to utilize mirroring routines to transfer the operating code and configuration parameters from the native controller's program memory directly to the spare controller's program memory.

Thus eliminating the need to store an image of the operating code and configuration parameters in the native controller's cache memory and simply utilize mirroring routines to transfer the image to the spare controller's cache memory.

Flash memory 114.3 is utilized to store operating code and configuration parameters. Flash memory is slower than program memory (e.g. D-RAM). Operating code and configuration parameters are downloaded from flash memory to program memory at start up because access time is faster. The present invention utilizes flash memory to store operating code and configuration parameters because it is essentially non-volatile and therefore is operable in situations where loss of data, such as, code and static structures is not tolerated. Flash memory does not have a battery but consumes low amounts of power. Flash memory gets its power supply from the disk array controller. When power is drastically reduced to flash memory, flash memory enters a standby mode where no power is consumed thereby making flash memory non-volatile. Unlike other programmable memory devices, such as EEPROMS, flash memory can be programmed or erased while installed within the circuit board, such as the disk array controller. EEPROMS needs to be removed from the circuit board and placed into a dedicated EEPROM programmer to be reprogrammed.

RDAC 118.2 is identical to RDAC 118.1 and is comprised of CPU 112.2, flash memory 114.4, program memory 114.2, cache memory 116.2, RPA 113.2, and co-processor 115.2, all interconnected via memory bus 152.2. To permit each RDAC to communicate with the other, the RDACs 118.1 and 118.2 are interconnected via shared bus 156.

The dual controller configuration can be operating in active/passive mode, that is, both controllers are online but for example RDAC 118.1 functions as a primary controller to receive read and write requests from the host computer while the RDAC 118.2 functions as a redundant controller. Alternatively, the dual controller configuration can be operating in active/active mode, that is, both RDAC 118.1 and 118.2 are online and functioning as a primary controller and a redundant controller. RDACs 118.1 and 118.2 are interchangeable devices within RAID subsystem 100 to permit easy replacement, including hot, warm, or cold swap, of a defective RDAC.

One of ordinary skill in the art will readily recognize that the block diagram of FIG. 1 is intended only as an exemplary design, which may embody the present invention. Many redundant controller and subsystem designs may embody the methods and associated apparatus and structures of the present invention.

Figure 1B:
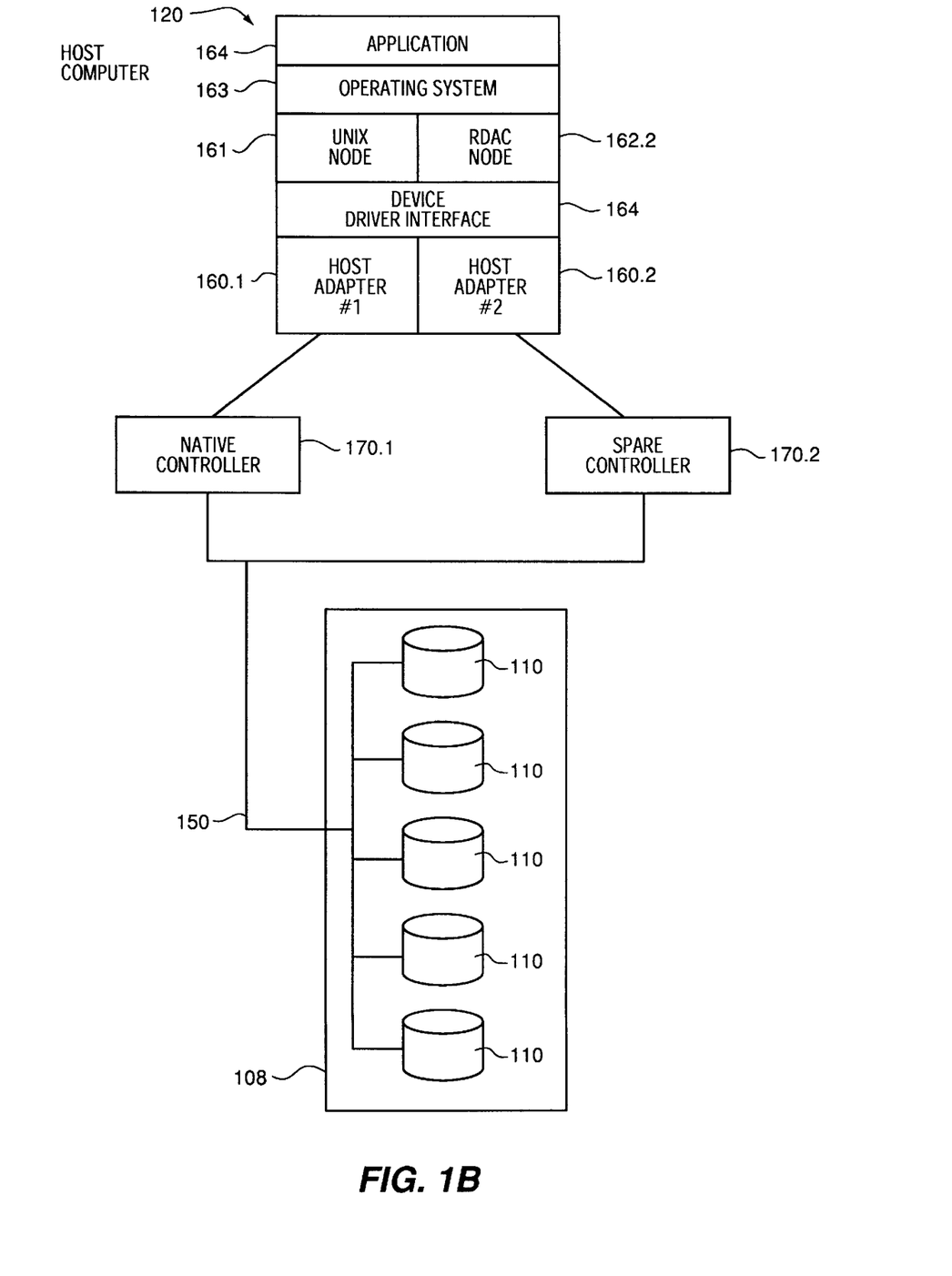
FIG. 1B is a block diagram of the present invention in which the methods of the present invention are also advantageously applicable.

For example, FIG. 1B shows a redundant controller design whereby host computer 120 contains all the application and disk array management software to direct and control native and spare controllers 170.1, 170.2. Host computer 120 contains user application software 164 operating above an operating system 163, such as UNIX. The RAID disk array management software is operating RDAC software, that is, the disk array management software within the RDAC node 162.2. The RDAC node receives host I/O requests for the disk array subsystem 100 and can reroute host I/O requests if controller 170.1 or 170.2 fail. If controller 170.1 or 170.2 fail, host I/O requests to the disk array subsystem may be rerouted through the UNIX system device nodes 161, however, these I/O requests will be lost because the RDAC software 162.2 doe not have any knowledge of these rerouted host I/O requests. In the present invention, the device driver interface 164 is the logical interface between the host computer 120 and the bus 150 and accepts high-level commands from the host computer 120 such as read sector or write sector. Host Adapters 160.1, 160.2 is the physical connection between the host computer 120 and the native controller 170.1 and spare controller 170.2. The native controller 170.1 and spare controller 170.2 accepts the high level commands from the device driver interface 164 and sends low level commands to the disk array 108 via bus 150. An ordinary person skilled in the art will realize either redundant controller design of FIG. 1A or 1B is operable to perform the present invention.

Similarly, an ordinary person skilled in the art will recognize the present invention is operable to synchronize the operating code and configuration parameters for a disk array subsystem comprising more than two controllers (e.g. N-controller disk array subsystem).

Figure 2:
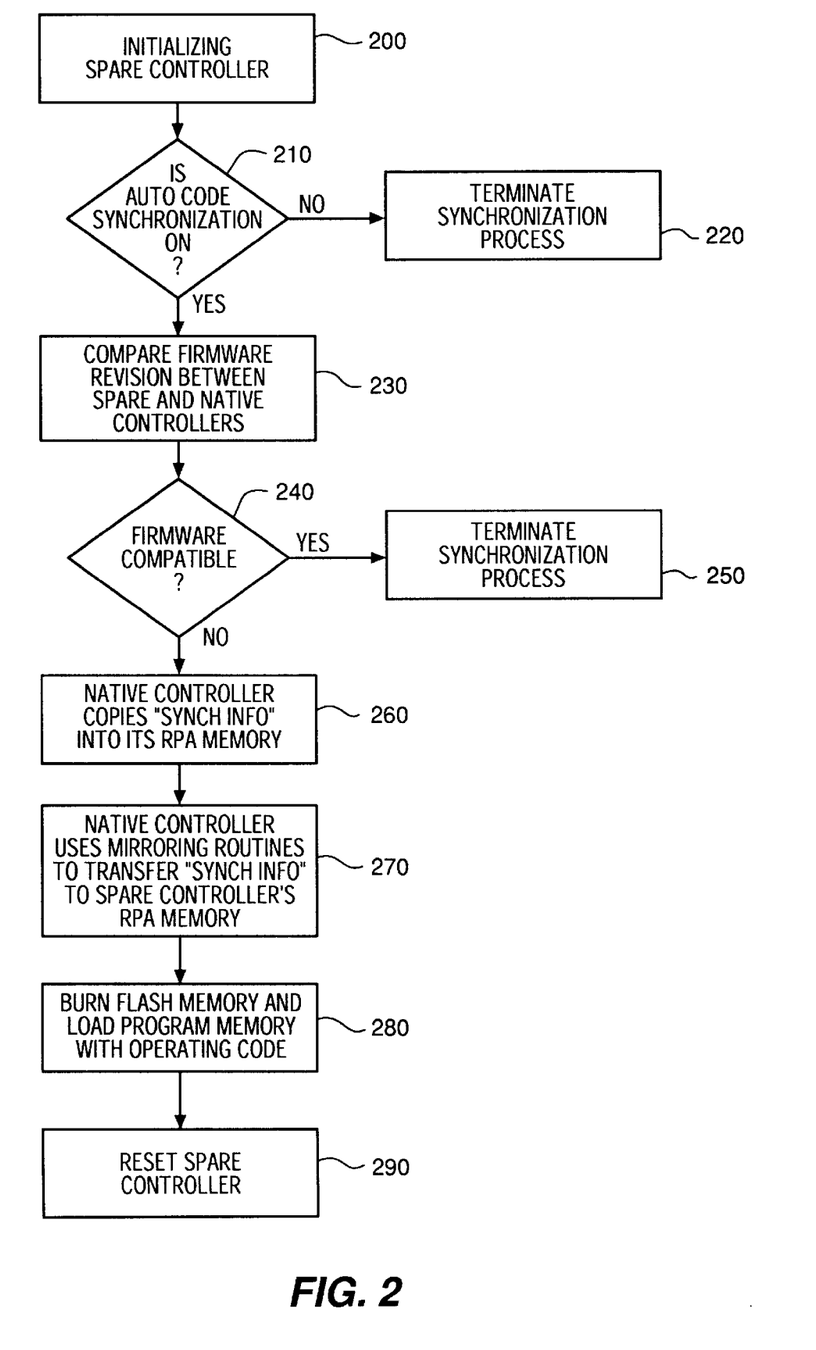
FIG. 2 is a flow diagram showing the synchronization technique of the first embodiment of the present invention.

FIG. 2 is a flow diagram showing how the present invention synchronizes the code between a native and spare controller. When a spare controller is hot, warm, or cold swapped into the dual configuration, a start-up or initialization phase is initiated 200 before the spare controller starts responding to host commands. This initialization phase performs various self tests on the spare controller where the spare controller sends communications to the native controller, sets the mode of the controller cache configuration (e.g., active/active or active/passive), and system configurations are set during this period such as lun configurations.

Additionally, the cache 116.1, 116.2 in RDAC 118.1 and 118.2 are configured. One portion of cache 116.1 in RDAC 118.1 is logically configured as primary cache and used for read/write requests from host computer. Similarly, one portion of cache 116.2 in RDAC 118.2 is logically configured as primary cache and used for read/write requests from the host computer. Cache 116.1 is logically partitioned into another section, the secondary, that is assigned for RDAC 118.1 for use in mirroring data that is stored in RDAC 118.2 primary cache memory. Likewise, cache 116.2 is logically partitioned into a secondary area that is assigned for RDAC 118.2 for use in mirroring data that is stored in RDAC 118.1 primary cache memory. RDAC 118.1 is responsible for managing write request data that it mirrors into the secondary cache memory area in RDAC 118.2. Similarly RDAC 118.2 is responsible for managing write request data that it mirrors into the secondary cache memory area in RDAC 118.1. The secondary cache area in cache 116.1 116.2 is assigned the same corresponding memory addresses as in the primary cache area.

In the first embodiment, lun quiescence is not required because the controller has not received any host I/O commands. Quiescence prevents new host I/O requests to the controller but allows the controller to complete any host I/O requests currently executing.

During this initialization phase, the parameters determining auto synchronization are read 210. Code synchronization occurs automatically if an auto code synchronization parameter is set and the versions of operating code are incompatible between the spare and native controller. A master auto code synchronization parameter in the native controller allows the user to disable or enable auto code synchronization. A second auto code synchronization parameter allows the synchronization of only spare controllers or any controller with incompatible firmware versions compared to the native controller's firmware. If, however, the master auto code synchronization parameter is disabled, the entire synchronization process is terminated 220.

Figure 2A:
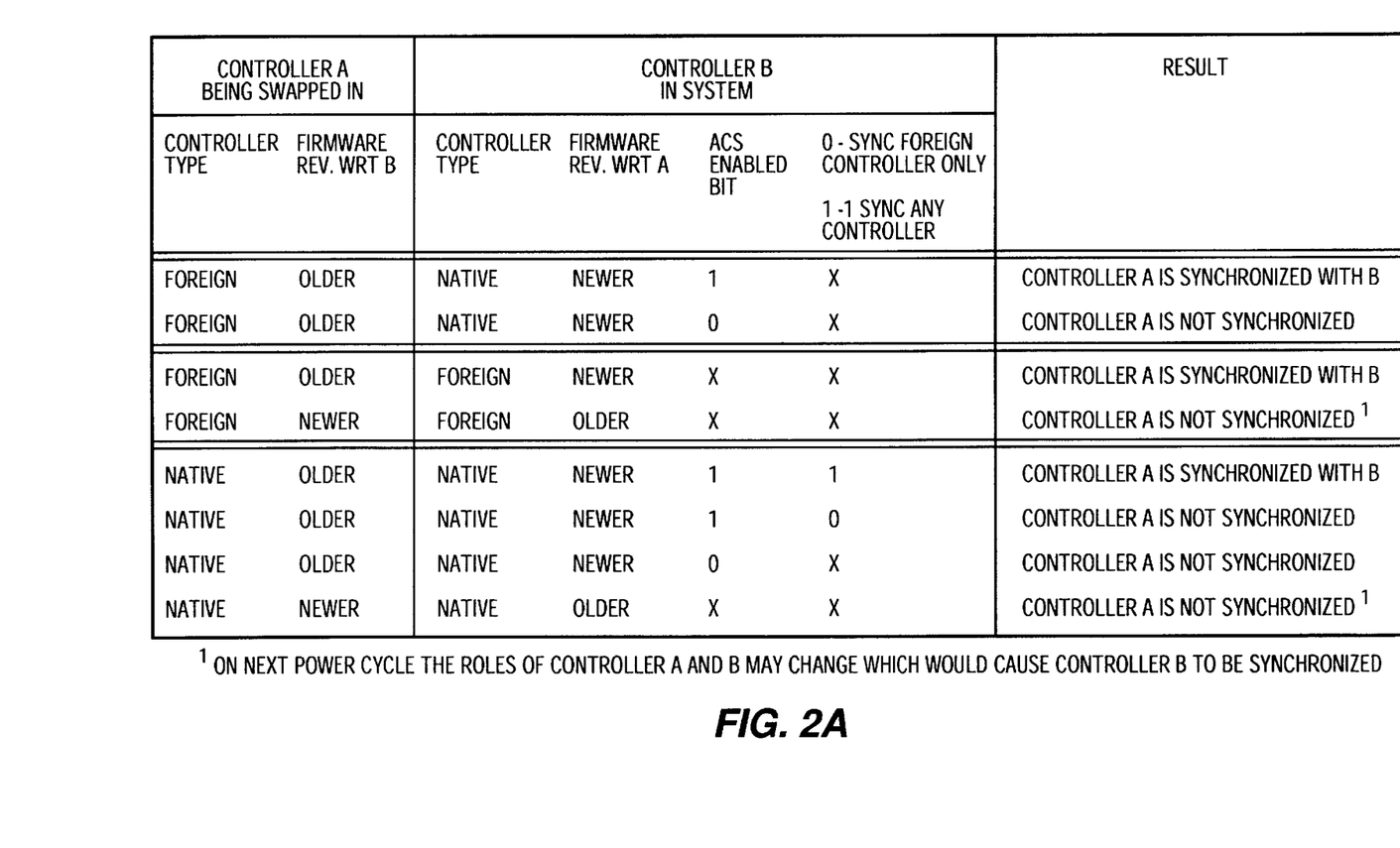
FIG. 2A is a table showing which controller is synchronized using the auto synch process.

FIG. 2A describes how the synchronization bits in the native controller determines whether synchronization will occur. The spare controller requests synchronization, and this request may or may not be accepted based on the synchronization parameters set in the native controller. For example, if the spare controller A is foreign, has different or older firmware revision than the native controller, B, and the auto code synchronization (ACS) bit is set, then controller A is synchronized with controller B's firmware. Note, that controller A can be a native controller if this controller was previously in the dual configuration but was swapped out and placed back into the dual configuration. If the spare controller A is foreign and has a newer firmware revision than the native controller B, the ACS bit is set, and the parameter-Sync Any Controller bit is set, then controller A is not synchronized with controllers B's firmware. Instead in the next power cycle, the roles of controller A and B are reversed, which causes controller B to be synchronized to controllers A newer firmware revision.

Next, the spare controller 230 compares the controller software revision for the spare 118.2 and native controller 118.1. If the firmware versions, that is, revision of operating code is compatible, then the process is terminated 250. If the revision of operating codes are incompatible, the spare controller requests synchronization 240.

The native controller 118.1 allocates RPA memory 113.1 space and creates a copy, that is, image of its operating code and configuration parameters from program memory 114.1 and stores this synch info within the allocated RPA memory 260. An ordinary person skilled in the art will recognize a copy of the native controller's operating code already exists in program memory 114.1 because the native controller CPU 112.1 downloaded a copy of its operating code from flash memory 114.3 to program memory 114.1 during start up and began executing the code at start-up.

The native controller 118.1 notifies the spare controller 118.2 that the image of its operating code is available in RPA memory 113.1 and sends the spare controller the address of its location in RPA memory 113.1. An ordinary person skilled in the art will recognize, the native controller 118.1 similarly could post the synch info to disk drive 110 and allow the spare controller 118.2 to retrieve the synch info from disk. In this case, the native controller 118.1 must send the spare controller the address of the synch info's location within the disk storage 108.

On receipt of the message from the native controller 118.1, the spare controller 118.2 allocates space within its RPA memory 113.2 for the image of the native controller's 118.1 operating code. Mirroring capability is provided through intercontroller connections. RPA memory 113.1 is connected to shared bus 156 via bus 152.1. Similarly, RPA memory 113.2 is connected to shared bus 156 via bus 152.2. The native controller uses mirroring techniques to transfer 270 the image to RPA memory 113.2. The present invention utilizes co-processor 115.1 to provide communications and coordination for the transfer of data between the native controller's RPA memory 113.1 to the spare controllers RPA memory 113.2 without assistance of the CPU 112.1. The co-processor 115.1 executes application specific code with the set of address ranges storing the synch info and performs the data transfer. Those skilled in the art will recognize equivalent embodiments of the present invention wherein mirroring may be performed in other manners. Such design choices in circuit and chip design are well known to those skilled in the art. Specific criteria including layout complexity, library component availability, etc. are considered in choosing among such equivalent designs.

If the mirroring is successful, the spare controller 118.2 notifies the native controller 118.1. Otherwise, the spare controller 118.2 notifies the native controller 118.1 than an error occurred and to terminate the synchronization process. Once mirroring is complete and as part of its housekeeping duties, the native controller frees the buffers in its RPA memory 113.1 containing the image of its operating code.

The spare controllers CPU 112.2 loads its program memory 114.2 and burns its flash memory 114.4 with the new operating code and configuration parameters 280. The spare controller reboots itself to execute the new operating code 290.

At this time, the spare controller can safely be brought online to begin accepting host I/O requests and it will not corrupt the current disk array subsystem 100 configuration. In the preferred embodiment, auto code synchronization parameters require that the spare controller 118.2 load the operating code image of the native controller's 118.1 operating code (e.g., application and bootware) even if the spare controller's 118.2 operating code is a newer revision than the native controller's 118.1. Alternatively, an ordinary person skilled in the art will recognize that the auto code synchronization parameters can be set to require synchronization to the operating code of the newer revision. That is, if the spare controller's 118.2 operating code is a newer revision than the native controller's 118.1, then the native controller 118.1 will be synchronized to the spare controller's 118.2 operating code.

Furthermore, the spare controller 118.2 has read only access to the dual array configuration and other system configuration information that is being used by the native controller 118.1. The spare controller 118.2 cannot modify any system configuration or dual array configuration information until code synchronization is successfully completed. Thus preventing current configuration information from being overwritten by the spare controller 118.2.

Figure 3:
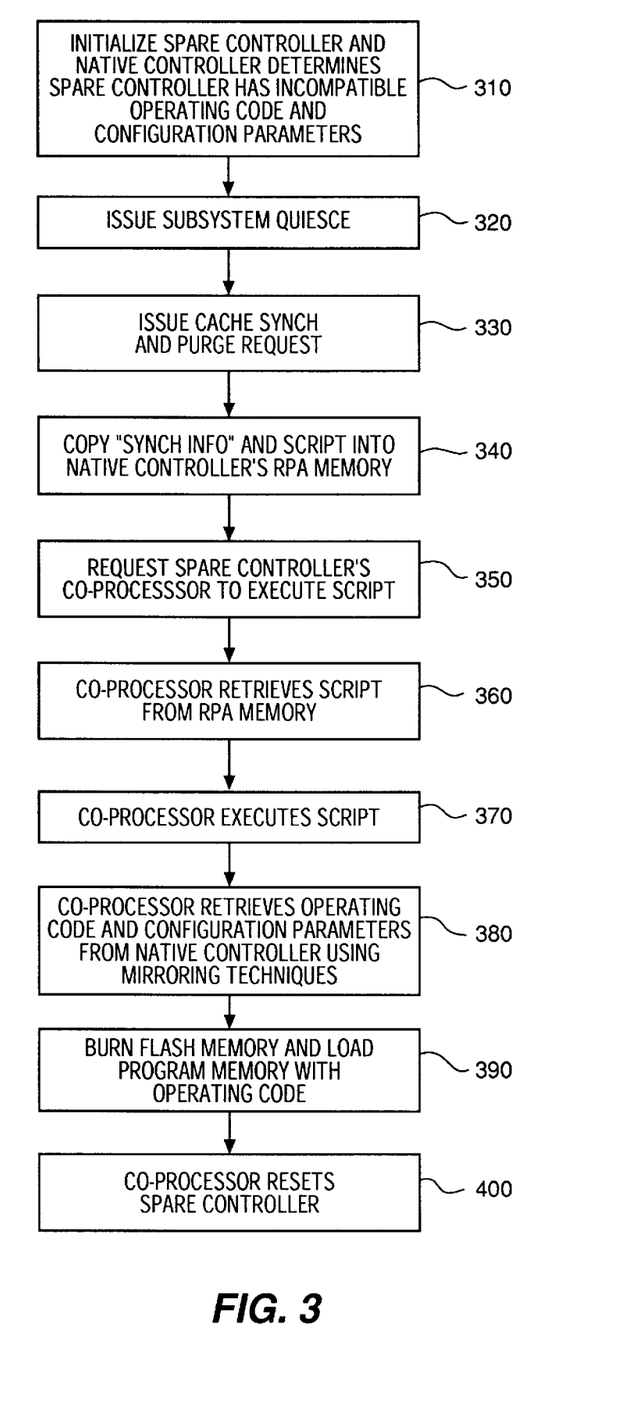
FIG. 3 is a flow diagram showing the synchronization technique of the second embodiment of the present invention.

FIG. 3 is a flow diagram showing a second embodiment of the present invention. In this embodiment, there is no auto code synchronization parameter. The native controller determines after the initialization process that the spare controller is operating an incompatible version, that is, revision of operating code and configuration parameters 310.

In the present invention, the spare controller may have been receiving host I/O requests. Therefore the native controller issues subsystem quiescence commands 320, which terminates all host I/O requests to the spare controller but allows the spare controller to complete any host V/O requests the spare controller was executing. The subsystem quiescence command does not need to be issued if hardware support existed to transfer operating code and configuration parameters from the native controller's program memory 114.1 to the spare controller's program memory 114.2. The present invention reserves RPA memory 113.2 within the cache memory 116.2 to store an image of the operating code and configuration parameters. Then this image is transferred from the native controller to the spare controller utilizing mirroring techniques. Since a portion of cache memory 116.2 is reserved, the subsystem quiescence commands are required to insure the reserved RPA area 113.2 of cache memory 116.2 is not currently in use to complete host I/O requests.

Additionally, the native controller issues requests similar to those sent during the previously discussed initialization process in order to configure the spare controller's cache memory 116.1 for mirroring purposes. For example, a request to the spare controller reconfigures the spare controller's cache memory 116.1 so that cache memory 116.1 is similar to the native controller's configuration 330. The native controller also sends a cache purge request to the spare controller 118.2 to initialize its cache memory 330.

In this embodiment, "synch info" includes the native controller's operating code, configuration parameters, and a script with instructions. The co-processor 115.2 executes the script to modify the operating code and configuration parameters within spare controller's program memory 114.2. The first portion of the script has instructions for the co-processor 115.2 to retrieve the synch info from the native controller's RPA memory 113.1. The script instructions contain the source addresses of the operating code within the native controller's RPA memory 113.1 and the destination addresses to transfer the operating code within the spare controller's RPA memory 113.2. The second portion of the script instructs the co-processor 115.2 to load the operating code in the spare controller's program memory 114.1 and flash memory 114.4, reset the CPU 112.2, and continue executing the new operating code and configuration parameters after the CPU 112.2 is reset. The application specific instructions which the co-processor 115.1, 115.2 executes are independent from controller firmware 114.1, 114.2.

The native controller 118.1 allocates an area within its RPA memory 113.1. The native controller 118.1 creates an image of its operating code and configuration parameters and builds the script of instructions, which includes the image of the operating code and configuration parameters 340. The native controller 118.1 stores this synch info within the allocated area in RPA memory 113.1.

The native controllers main processor 112.1 issues a request to execute the first portion of the script utilizing the spare controller's co-processor 115.2 350. The spare controller's co-processor 115.2 retrieves the script from the native controller's RPA memory 113.1 360 and stores the script in the spare controller's RPA memory 113.2. The spare controller's co-processor 115.2 executes the first portion of the script 370 by retrieving the operating code and configuration parameters from the native controller's RPA memory 113.1 using mirroring techniques 380. If the transfer is successful, the native controller as part of its housekeeping duties frees the buffers storing its operating code within RPA memory 113.1.

While the main processor 112.2 within the spare controller 118.2 is executing its previous operating code, the main processor 112.2 initializes the program memory 114.2. The co-processor 115.2, within the spare controller 118.2, executes the second portion of the script by loading the spare controller's program memory 114.2, burning the flash memory 114.4 with the operating code and configuration parameters, and interrupts the spare controller's main processor 112.2 to reset the spare controller's main CPU 112.2.

Figure 4:
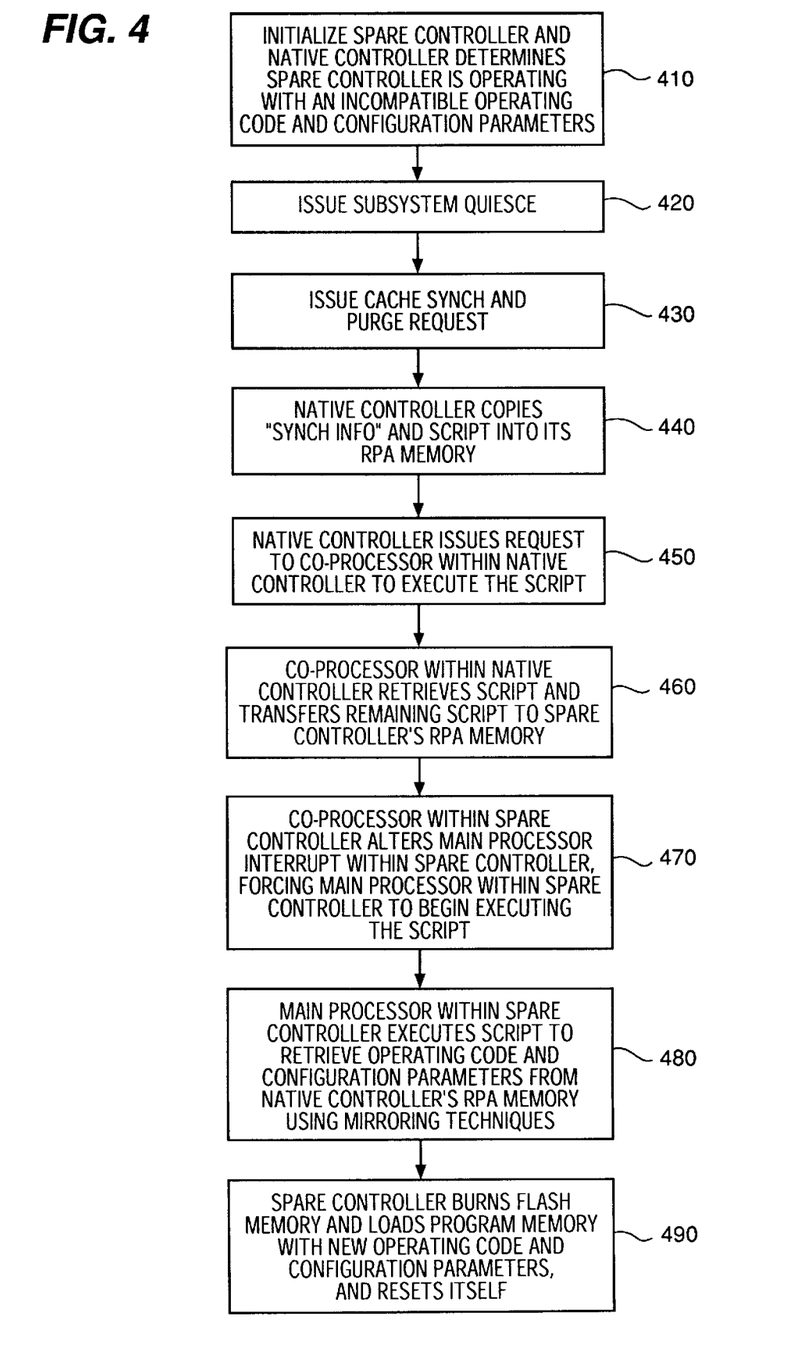
FIG. 4 is a flow diagram showing the synchronization technique of a third embodiment of the present invention.

Although the best mode of the present embodiments has been described, an ordinary person skilled in the art will note that other designs are possible. FIG. 4 is a flow diagram of another embodiment, which is operable to synchronize the code between a native and spare controller. In this embodiment, the main processor 112.1 within the native controller 118.1 builds a script that utilizes co-processor 115.1 to assist in the transfer of the operating code to the spare controller.

After initialization, the native controller 118.1 determines that the spare controller 118.2 is operating with an incompatible version, that is, revision of firmware 410. The native controller 118.1 issues a subsystem quiescence command and waits for successful completion of the command 420. Thereby terminating all host I/O requests to the spare controller and any host I/O request, the spare controller was executing. Next, the native controller 118.1 issues a cache synch and purge request 430 to the spare controller 118.2. The cache synch request will modify the cache configuration to match that of the native controller and the cache purge request initializes the spare controller's cache memory.

The native controller allocates an area within its RPA memory 113.1. The native controller 118.1 creates an image of its operating code and configuration parameters and builds a script. The native controller 118.1 stores the "synch info" within the allocated area in its RPA memory 113.1 440. In this embodiment, the first portion of the script contains instructions for transferring the script to the spare controller's RPA memory, and mirroring the operating code and configuration parameters to the spare controller's RPA memory. The second portion of the script contains instructions for loading the operating code and configuration parameters to the spare controller's program memory 114.1 and flash memory 114.4, resetting the CPU 112.2, and continuing the execution of the new operating code and configuration parameters after the CPU 112.2 is reset.

The native controller issues a request to co-processor 115.1 to execute a first portion of the script 450. The script instructs the co-processor 115.1 to retrieve the script from the native controller's RPA memory 113.1 and write the remaining script to the spare controller's RPA memory 113.2 460. The spare controller 118.2 receives the script from the native controller 118.1 as part of the write request. The co-processor 115.2 within the spare controller 118.2 begins executing the remaining script. The script changes the spare controller's 118.2 main processor 112.2 operating environment to allow execution out of RPA memory 113.2 and changes the main processor's 112.2 interrupt vector to execute the script within RPA memory 113.2 470.

The main processor 112.2 within the spare controller 118.2 continues to execute the script to retrieve the operating code and configuration parameters from the native controller's 118.1 RPA memory 113.1 using mirroring techniques 480. In the second portion of the script, the main processor 112.2 within the spare controller to loads the program memory 114.2 and burns the flash memory 114.4 with the operating code and configuration parameters. Additionally, the main processor 112.2 resets itself to start executing the new operating code and utilizing the new configuration parameters 490.

The present invention allows the native controller to update the spare controller's software and configuration parameters using logical processes and therefore does not depend upon any special hardware within the spare controller. As in the first embodiment, the second and third embodiments ensure the spare controller will always receive the program image of the native controller even if the spare controller's operating code and configuration parameters are newer than the native controller's operating code. As previously stated, the spare controller has read only access to the system configuration information until code synchronization is complete to prevent current configuration information from being overwritten by the spare controller.

The present invention does not require a determination of the software revision level, within the controller firmware, of the spare controller before placing the spare controller in the disk array storage subsystem. The present invention ensures that the spare controller firmware is compatible with the native controller's firmware using logical processes. Thereby eliminating the need for a user to manually modify the spare controller's operating code and eliminating the need for any hardwired reset lines to reset the spare controller.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A method for synchronizing disk controller operating code in a storage subsystem, said storage subsystem including a first controller and a spare controller said method comprising the steps of:

determining the compatibility of first revision information of a first controller with second revision information of said spare controller wherein the determination is made within said first controller by direct access to memory in said spare controller via a shared bus connecting said first controller and said spare controller; and modifying said operating code of said spare controller for compatibility with said operating code of said first controller, in response to said step of determining comparison wherein said operating code includes program instructions for operating said spare controller and wherein the modification includes direct access to memory in said spare controller via a shared bus connecting said first controller and said spare controller.

2. The method of claim 1 wherein the step of modifying includes the step of:

modifying configuration parameters of said spare controller for compatibility with configuration parameters of said first controller.

3. The method of claim 1 wherein said step of modifying said spare controller comprises the steps of:

creating an image of said operating code from said first controller;

storing said image of said operating code to local memory of said first controller;

duplicating said image of said operating code from said first controller to local memory of said spare controller;

storing the duplicated operating code to program memory in said spare controller; and resetting said spare controller to start executing the duplicated operating code.

4. The method of claim 3, wherein said spare controller includes a main processor and a co-processor and wherein the step of duplicating further comprises the steps of:

transferring a script, by operation of said co-processor, from said local memory in said first controller to local memory within said spare controller; and executing a first portion of said script, within said co-processor, to transfer said operating code from said first controller to local memory of said spare controller.

5. The method of claim 4 wherein said spare controller includes a main processor and a co-processor and wherein the step of storing duplicated operating code in program memory further comprises the steps of:

executing a second portion of said script, within said co-processor, to store said operating code into program memory of said spare controller; and interrupting said main processor of said spare controller, by operation of said co-processor, to commence execution of said operating code within program memory in said spare controller.

6. The method of claim 3 wherein said first controller includes a main processor and a co-processor and said spare controller includes a main processor and a co-processor, and wherein the step of duplicating further comprises the steps of:

transferring a script, by operation of said first controller's co-processor, from said local memory in said first controller to local memory within said spare controller;

executing a first portion of said script, within said spare controller's co-processor, to interrupt said main processor of said spare controller to commence execution of said first portion of said script within local memory of said spare controller to transfer said operating code from local memory within said first controller to local memory of said spare controller.

7. The method of claim 6 wherein the step of storing duplicated operating code in program memory further comprises the steps of:

executing a second portion of said script, within said main processor of said spare controller, to load said operating code into program memory of said spare controller; and interrupting said main processor of said spare controller to commence execution of said operating code within program memory in said spare controller.

8. The method of claim 1 wherein said storage subsystem is coupled to a plurality of disks and wherein the step of modifying said spare controller comprises the steps of:

storing a copy of said operating code from said first controller to at least one of said plurality of disks;

transferring said copy of operating code from said at least one of said plurality of disks to program memory of said spare controller; and resetting said spare controller to start running said operating code from said program memory.

9. In a storage subsystem, an apparatus for synchronizing operating code for at least one controller, said apparatus comprising:

a first controller having a first revision operating code;

at least one redundant controller having a second revision operating code;

a shared bus connecting said first controller and said at least one redundant controller;

comparison means within said first controller for comparing said first revision operating code with said second revision operating code wherein the comparison is by direct access to memory within said at least one redundant controller via said shared bus;

modifying means for modifying said second revision operating code of said redundant controller for compatibility with said first revision operating code of said first controller in response to said step of comparison wherein said first revision operating code includes program instructions for operating said first controller and wherein said second revision operating code includes program instructions for operating said at least one redundant controller.

10. The apparatus of claim 9 wherein said modifying means includes:

means for storing a copy of said first revision operating code from said first controller in local memory of said first controller;

means for duplicating the stored copy of said first revision operating code from said first controller to local memory of said at least one redundant controller wherein said means for duplicating utilizes said shared bus;

means for loading the duplicated operating code to program memory in said at least one redundant controller;

means for resetting said at least one redundant controller to start running the duplicated operating code.

11. The apparatus of claim 10 wherein said at least one redundant controller includes a main processor and a co-processor and wherein said means for duplicating further comprises:

means for transferring a script, by operation of said co-processor, from said local memory in said first controller to local memory within said at least one redundant controller utilizing said shared bus; and means for executing a first portion of said script, within said co-processor, to transfer said operating code from said first controller to local memory of said at least one redundant controller.

12. The apparatus of claim 11 wherein said means for loading further comprises:

means for executing a second portion of said script, within said co-processor, to load said operating code into program memory of said at least one redundant controller; and means for interrupting said main processor of said at least one redundant controller, by operation of said co-processor, to commence execution by said main processor of said operating code within program memory in said at least one redundant controller.

13. The apparatus of claim 10 wherein said first controller includes a main processor and a co-processor and said at least one redundant controller includes a main processor and a co-processor, and wherein said means for duplicating further comprises:

means for transferring a script, by operation of said first controller's co-processor, from said local memory in said first controller to local memory within said at least one redundant controller utilizing said shared bus;

means for executing a first portion of said script, within said at least one redundant controller's co-processor, to interrupt said main processor of said at least one redundant controller to commence execution of said first portion of said script within local memory of said at least one redundant controller to transfer said operating code from local memory within said first controller to local memory of said at least one redundant controller via said shared bus.

14. The apparatus of claim 13 wherein said means for loading further comprises:

means for executing a second portion of said script, within said main processor of said at least one redundant controller, to load said operating code into program memory of said at least one redundant controller; and means for interrupting said main processor of said at least one redundant controller to commence execution of said operating code within program memory in said at least one redundant controller.

15. The apparatus of claim 9 wherein said storage subsystem is coupled to a plurality of disks and wherein said modifying means comprises:

means within said first controller for storing a copy of said first revision operating code from said first controller to at least one of said plurality of disks;

means within said at least one redundant controller for transferring said copy of said first revision operating code from said at least one of said plurality of disks to program memory of said at least one redundant controller; and means for resetting said at least one redundant controller to start running said operating code from said program memory.

16. A method for updating operating code in a spare controller of a multi-controller storage subsystem comprising the steps of:

detecting, within a first controller, the presence of new controller in said storage subsystem;

determining, within said first controller, that operating code in said new controller is inconsistent with operating code in said first controller;

updating program memory in said new controller by copying said operating code in said first controller to said new controller over a shared bus coupling said first controller to said new controller; and restarting operation of said new controller to use updated operating code in said program memory copied to said new controller from said first controller.

17. The method of claim 16 wherein said spare controller has a main processor and an I/O co-processor and wherein said I/O co-processor executes script commands and wherein the step of updating includes the steps of:

asserting a signal from said I/O co-processor to said main processor to pause processing of said main processor;

transferring a sequence of script commands from said first controller to a memory of said spare controller over said share bus; and executing, within said I/O co-processor, said sequence of script commands to copy said operating code in said first controller to said program memory of said spare controller, wherein the step of restarting includes the step of:

asserting a signal from said I/O co-processor to said main processor to restart processing of said main processor using the copied operating code in said program memory.

* * * * *